US009306612B2

(12) United States Patent
Forsythe (10) Patent No.: US 9,306,612 B2
(45) Date of Patent: Apr. 5, 2016

(54) MOBILE ELECTRONIC DEVICE HOLDER

(71) Applicant: Quantas Forsythe, Bloomfield, CT (US)

(72) Inventor: Quantas Forsythe, Bloomfield, CT (US)

(*) Notice: Subject to any disclaimer, the term of this patent is extended or adjusted under 35 U.S.C. 154(b) by 0 days.

(21) Appl. No.: 14/745,561

(22) Filed: Jun. 22, 2015

(65) Prior Publication Data
US 2015/0288409 A1  Oct. 8, 2015

Related U.S. Application Data

(60) Provisional application No. 62/019,953, filed on Jul. 2, 2014.

(51) Int. Cl.
*A45C 11/00* (2006.01)
*H04B 1/3888* (2015.01)
*H04B 1/3827* (2015.01)

(52) U.S. Cl.
CPC .............. *H04B 1/3888* (2013.01); *H04B 1/385* (2013.01); *H04B 2001/3855* (2013.01)

(58) Field of Classification Search
CPC ................. H04B 1/3888; H04B 1/385; H04B 2001/3855
USPC ......... 455/414.1, 575.1–575.8; 355/168, 169, 355/204, 76
See application file for complete search history.

(56) References Cited

U.S. PATENT DOCUMENTS

| | | | |
|---|---|---|---|
| 6,454,146 B2 | 9/2002 | Alis | |
| 6,648,139 B2* | 11/2003 | Fisher, Jr. | G06F 1/1626 206/320 |
| 6,651,854 B1 | 11/2003 | Lacoste | |
| 7,607,462 B2* | 10/2009 | Degliobizzi | A45C 1/04 150/106 |
| 7,768,778 B2* | 8/2010 | Huang | G06F 1/1632 340/5.1 |
| 7,912,522 B2* | 3/2011 | Pierson | A45C 11/00 379/449 |
| 8,960,634 B2* | 2/2015 | Le Gette | F16M 11/04 248/163.1 |
| 2006/0151077 A1* | 7/2006 | Milford | A45C 1/06 150/147 |
| 2006/0283768 A1* | 12/2006 | Schriner | D04C 7/00 206/574 |
| 2007/0293288 A1* | 12/2007 | Lin | H04M 1/04 455/575.8 |
| 2008/0128299 A1* | 6/2008 | Moldolan | A45C 11/38 206/232 |
| 2009/0008419 A1 | 1/2009 | Tsang et al. | |
| 2009/0229936 A1* | 9/2009 | Cuong | A45C 5/03 190/107 |
| 2010/0206976 A1 | 8/2010 | Salentine et al. | |
| 2012/0190413 A1 | 7/2012 | Ojeda | |
| 2012/0314351 A1* | 12/2012 | Kroupa | B65H 75/4434 361/679.01 |
| 2013/0015088 A1* | 1/2013 | Wu | A45C 11/00 206/320 |
| 2013/0213838 A1* | 8/2013 | Tsai | G06F 1/1633 206/320 |

(Continued)

FOREIGN PATENT DOCUMENTS

KR   20140126786 A  * 11/2014  ............. A45C 11/00

*Primary Examiner* — Khawar Iqbal
(74) *Attorney, Agent, or Firm* — Daniel Boudwin; Global Intellectual Property Agency, LLC (57) ABSTRACT

A mobile electronic device holder for retaining electronic devices of various sizes and configurations in a foldable case that removably secures to a variety of surfaces. The mobile electronic device holder includes a foldable base having a first, second, and third panel, wherein the first panel is removably secured to the second panel and the second panel is secured to the third panel. The first panel includes a pair of flexible and extendable arms that are used to hold an electronic device therein. A first and second retracting mechanism are attached to the second panel so as to removably connect the first panel thereto. The mobile electronic device holder further includes a variety of attachments and fasteners in order to allow the user to removably secure the foldable base to a variety of surfaces.

19 Claims, 6 Drawing Sheets

(56) References Cited

U.S. PATENT DOCUMENTS

| | | | | |
|---|---|---|---|---|
| 2013/0331155 A1* | 12/2013 | Tages | H04M 1/0283 | 455/575.8 |
| 2014/0105441 A1* | 4/2014 | Kroupa | B65H 75/4434 | 381/370 |
| 2014/0187289 A1* | 7/2014 | Cataldo | H05K 13/00 | 455/557 |
| 2014/0314266 A1* | 10/2014 | Kroupa | B65H 75/4431 | 381/384 |
| 2014/0333542 A1* | 11/2014 | Barreca | G06F 1/1669 | 345/169 |
| 2014/0370944 A1* | 12/2014 | Green | G06F 1/1626 | 455/575.1 |
| 2015/0014213 A1* | 1/2015 | Merenda | B65H 75/48 | 206/581 |
| 2015/0080067 A1* | 3/2015 | Chen | H04B 1/3888 | 455/575.8 |
| 2015/0108012 A1* | 4/2015 | Poon | F16M 13/00 | 206/45.23 |
| 2015/0111624 A1* | 4/2015 | Peel | H04B 1/3877 | 455/575.8 |
| 2015/0201053 A1* | 7/2015 | Nyholm | A45C 11/00 | 455/575.1 |
| 2015/0201266 A1* | 7/2015 | Abreu | H04R 1/1033 | 381/374 |
| 2015/0318888 A1* | 11/2015 | Zhang | A45C 11/00 | 455/575.8 |

* cited by examiner

MOBILE ELECTRONIC DEVICE HOLDER

CROSS REFERENCE TO RELATED APPLICATION

This application claims the benefit of U.S. Provisional Application No. 62/019,953 filed on Jul. 2, 2014. The above identified patent application is herein incorporated by reference in its entirety to provide continuity of disclosure.

BACKGROUND OF THE INVENTION

Field of the Invention

The present invention relates to mobile electronic device holders. More specifically, the present invention provides a foldable base having a first, second, and third panel, wherein the second panel is secured to the third panel. The first panel is removably secured to the second panel by a pair of retracting mechanisms disposed on the second panel. The first panel includes a pair of flexible and extendable arms that are used to hold electronic devices, such as a smartphone. The second panel comprises a pair of clips that are adapted to removably secure to a surface, such as a vehicle visor, whereby the first panel is able to suspend therefrom. The mobile electronic device holder further includes a variety of attachments and fasteners adapted to allow the user to removably attach the foldable base to a variety of surfaces, such as a vehicle dashboard holder, a belt, around a user's neck, on a flat horizontal surface, and the like.

Mobile electronic devices, such as smartphones, e-readers, and tablet computers, have become an essential part of daily life. Immediate access to such devices is needed in order to stay connected to other people, find a location using navigation tools, or conduct business thereon. Many people hold or carry these mobile devices in a pocket or a purse throughout the day. As a result, these devices can be easily dropped, thereby causing damage or resulting in the loss of the device. These devices are expensive to replace or repair. Furthermore, in order to display or operate the mobile electronic devices, a user will often be required to hold the device in his or her hands, which can be inconvenient and limit the ability of a user to function without the use of his or her hands. Thus, a holder that allows a user to removably secure mobile electronic devices to various surfaces, such as the user's belt, a vehicle dashboard, a vehicle visor, or the like, is desired.

It is submitted that the present invention substantially diverges in design elements from the prior art and consequently it is clear that there is a need in the art for an improvement to existing mobile electronic device holders. In this regard the instant invention substantially fulfills these needs.

SUMMARY OF THE INVENTION

In view of the foregoing disadvantages inherent in the known types of mobile electronic device holders now present in the prior art, the present invention provides a new mobile electronic device holder wherein the same can be utilized for providing convenience for the user when carrying and displaying mobile electronic devices on various surfaces.

It is therefore an object of the present invention to provide a new and improved mobile electronic device holder that has all of the advantages of the prior art and none of the disadvantages.

It is another object of the present invention to provide a mobile electronic device holder comprising a foldable base having a first, second, and third panel, wherein the first panel is removably secured to the second panel and the second panel is secured to the third panel.

Another object of the present invention is to provide a mobile electronic device holder wherein the front surface of the first panel includes a pair of flexible and extendable arms adapted to hold various devices therein.

Another object of the present invention is to provide a mobile electronic device holder further comprising a pair of housing units attached to the rear surface of the second panel, wherein the housing units include a retracting mechanism adapted to removably secure the first panel to the second panel.

Yet another object of the present invention is to provide a mobile electronic device holder having one or more fasteners and one or more attachments disposed on the rear and front surfaces of the foldable base adapted to removably attach the mobile electronic device holder to various surfaces, such as a vehicle dashboard holder, a vehicle visor, a belt, around a user's neck, on a flat horizontal surface, and the like.

Another object of the present invention is to provide a mobile electronic device holder that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the mobile electronic device holder. For the purposes of presenting a brief and clear description of the present invention, the preferred embodiment will be discussed as used for carrying and displaying mobile electronic devices. The figures are intended for representative purposes only and should not be considered to be limiting in any respect.

Figure 1A:
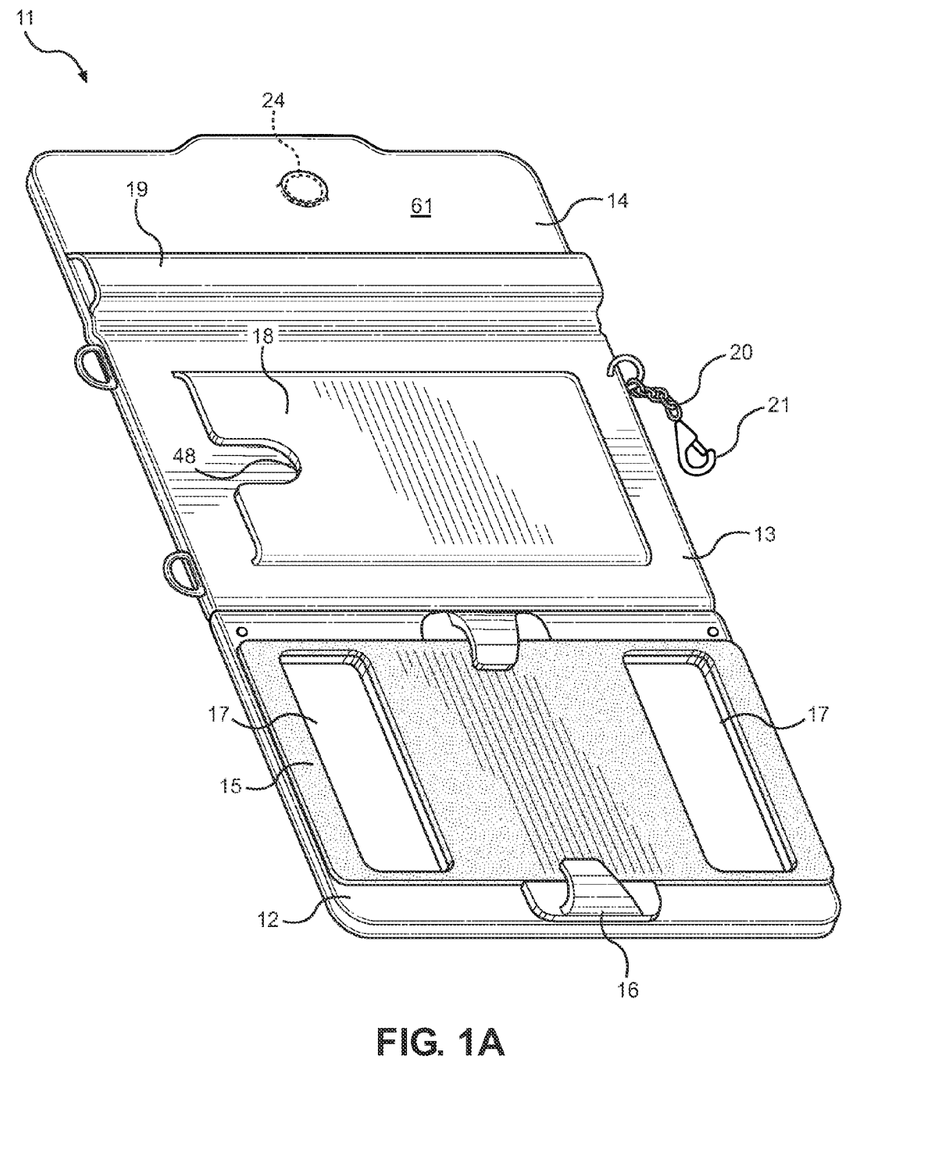
FIG. 1A shows a perspective view of the front surface of the mobile electronic device holder.
Figure 1B:
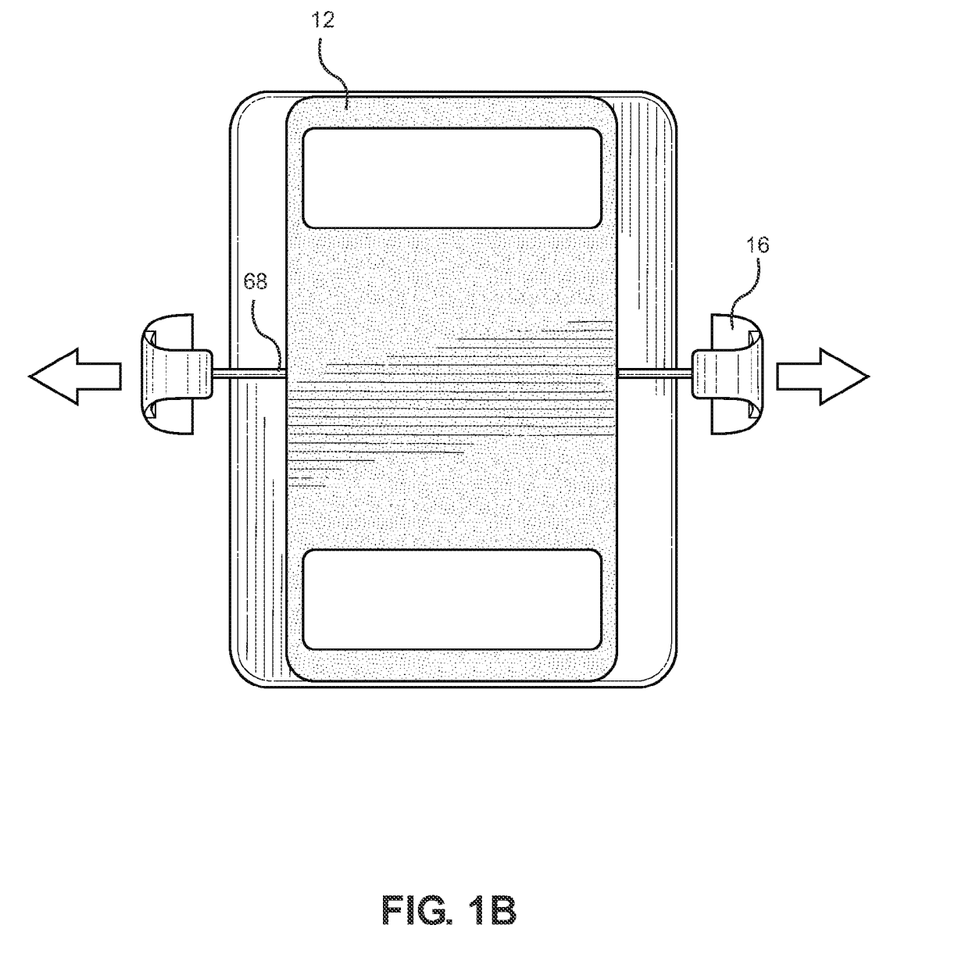
FIG. 1B shows a perspective view of the front surface of the first panel of the mobile electronic device holder wherein the arms are in an extended configuration.

Referring now to FIGS. 1A and 1B, there is shown a perspective view of the front surface of the mobile electronic device holder and a perspective view of the front surface of the first panel of the mobile electronic device holder wherein the arms are in an extended configuration, respectively. The mobile electronic device holder 11 comprises a foldable base having a front surface 61 and a rear surface, wherein the foldable base includes a first panel 12, a second panel 13, and a third panel 14. The first panel 12 is removably secured to the second panel 13 and the second panel 13 is secured to the third panel 14 such that the panels of the mobile electronic device holder 11 are arranged linearly. Thus, the first panel 12 is attached to a first side of the second panel 13 and the third panel 14 is attached to the opposite side of the second panel 13. The front surface 61 of the first panel 12 is adapted to receive a mobile electronic device thereon, such as a smartphone, such that the rear surface of the mobile electronic device will rest flush against the front surface 61 of the first panel 12. The second and third panels 13, 14 are adapted to fold around the mobile electronic device, wherein the third panel 14 removably fastens to the rear surface of the first panel 12 so the foldable base can remain in a closed positon, if desired. The panels 12, 13, 14 are preferably rectangular in configuration.

Figure 5:
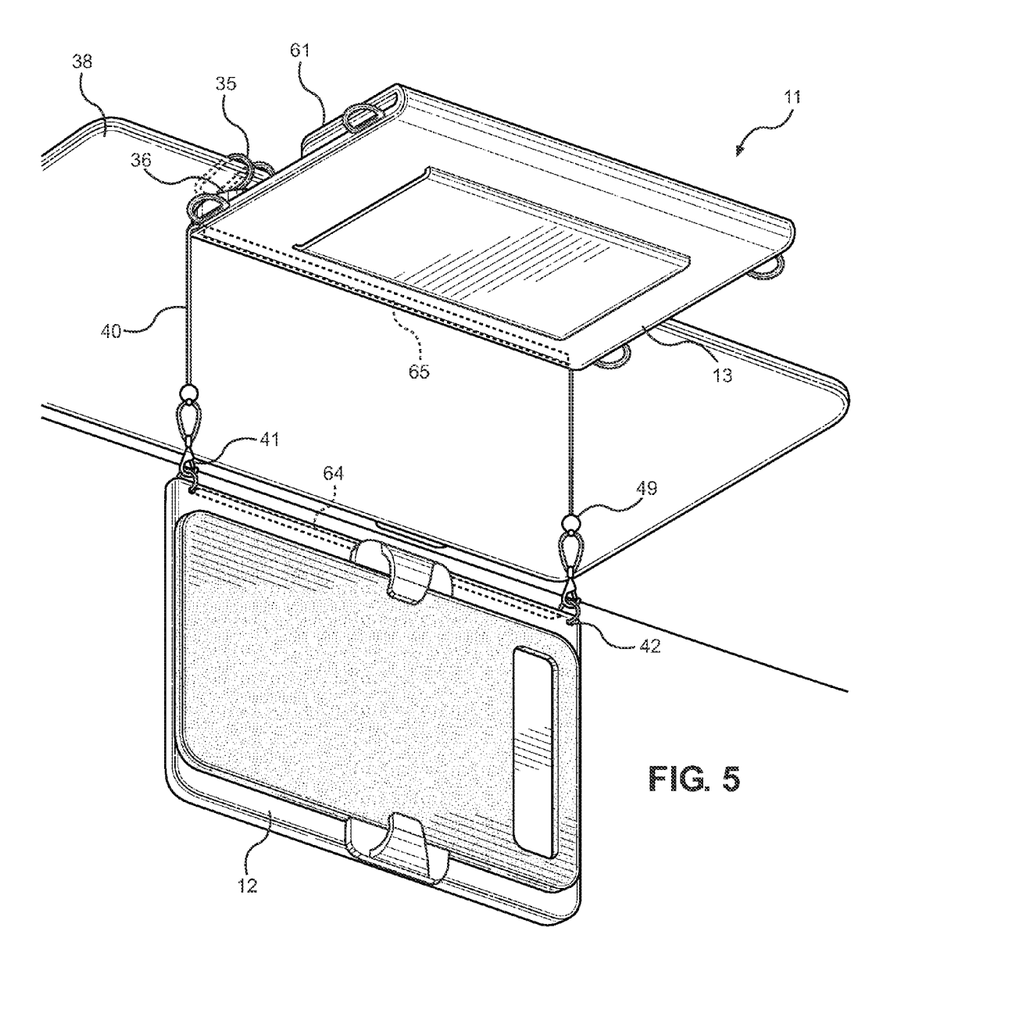
FIG. 5 shows a perspective view of an embodiment of the mobile electronic device holder wherein the first panel is suspended from the second panel by the retracting mechanism.

The front surface 61 of the first panel 12 includes a pair of flexible and extendable arms 16 adapted to removably secure a mobile electronic device therebetween. Each arm 16 is disposed on an opposing side of the first panel 12 in order to removably secure to opposing sides of a mobile electronic device. The arms 16 move inwardly and are positioned centrally on the first panel 12. The upper section of the arm 16 is adapted to fit over the lateral edge of the upper surface of the mobile electronic device (as illustrated in FIG. 5). The flexibility of the arm 16 allows it to bend, thereby allowing the upper section to extend upward from the front surface 61 of the panel 12 so the lateral edges of the mobile electronic device can be positioned within the arms. In this way, the mobile electronic device fits securely on the front surface 61 of the first panel 12. The arms 16 can be composed of any suitable material, such as rubber or plastic. In some embodiments, the front surface 61 of the first panel 12 comprises a pair of recessed areas each adapted to receive an arm 16 therein. Thus, the arms 16 are able to remain in a resting position when disposed therein.

The arms 16 are secured together by a stretchable strap 68 that allow the arms 16 to radially extend in order to fit over larger sized mobile electronic devices. In other embodiments, the arms 16 can be adjustably secured to one another by any suitable means. In some embodiments, the second panel 13 comprises an aperture disposed on the lateral side that is removably secured to the first panel 12, wherein the aperture is adapted to receive an arm 16 therethrough. In this way, if a large mobile electronic device is disposed on the first panel 12, the arm 16 is able to fit through the aperture in order for the foldable base to be disposed in a closed configuration.

The mobile electronic device holder 11 includes a plurality of openings 17 adapted to allow a camera lens of a mobile electronic device to be visible therethrough. In the illustrated embodiment, the first panel 12 comprises a pair of openings 17 rectangular in configuration and disposed along the upper end and lower end of the first panel 12. In this way, the openings 17 can accommodate mobile electronic devices having camera lenses disposed at various points thereon, as well as accommodate the orientation of a mobile electronic device disposed therein.

The first panel 12 further includes a pad 15 that rests on the front surface 61 and is adapted to frictionally and removably secure the mobile electronic device thereon. The configuration of the pad 15 is similar to the configuration of the first panel 12. In this way, the pad 15 is disposed on the maximum area available on the first panel 12 in order to interface with the rear surface of the mobile electronic device. The pad 15 is preferably composed of a non-slip material, such as rubber. In some embodiments, the pad 15 is removably secured to the front surface 61 of the first panel 12 and is composed of material adapted to be washed. In some embodiments, the pad is textured to further frictionally and removably attach the mobile electronic device thereon. The pad 15 can include textures, such as ridges.

The front surface of the second panel 13 includes one or more pockets 18 adapted to receive flat objects therein, such as credit cards and licenses. The pockets 18 comprise a flat panel, preferably rectangular in configuration, permanently attached to the front surface 61 of the second panel 13 by any suitable means, such as stitching. The center of the opening of the pocket 18 includes a U-shaped cutout 48 so as to allow a user to pull out a flat object, such as a credit card, included therein. The second panel 13 further comprises one or more key fasteners 21, such as a clip, adapted to attach keys thereto. In the illustrated embodiment, the key fastener 21 is attached to a chain 20, allowing the key fastener 21 to suspend therefrom. In other embodiments, the key fastener 21 is secured to a retracting device disposed on the foldable base. The retracting device is adapted to allow a key attached to the key fastener 21 to be extended therefrom without having to detach the key from the key fastener 21 or move the foldable base in order to use it.

The front surface 61 of the third panel 14 includes one or more elongated pockets 19 adapted to fit a cable therein. The pockets 19 are preferably rectangular in configuration and extend the length of the third panel 14. One or more closing fasteners 24 are included on the front surface 61 of the third panel 14. In the illustrated embodiment, the closing fastener 24 is a circular magnet receiving piece adapted to receive one or more magnets included on the rear surface of the first panel 12 (as referenced in FIG. 2, 27). In this way, the foldable base is capable of remaining in a folded position. The magnet receiving piece is preferably disposed beneath a liner covering the front surface 61 of the third panel 14. In this way, the receiving piece is protected from becoming damaged or removed from the front surface 61 of the third panel 14. In some embodiments, the fastener is a clip adapted to attach to a hook or ring disposed on the rear surface of the first panel 12.

Figure 2:
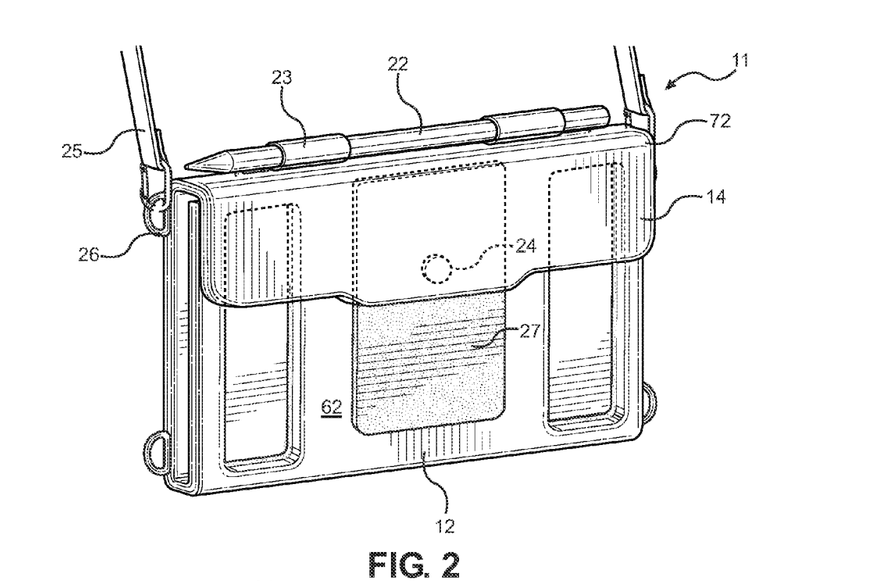
FIG. 2 shows a perspective view of the mobile electronic device holder in a folded configuration.

Referring now to FIG. 2, there is shown a perspective view of the mobile electronic device holder in a folded configuration. The mobile electronic device holder 11 further includes one or more neck straps 25 and a plurality of rings 26 disposed on the foldable base adapted to removably secure the neck strap to the holder 11. The neck strap 25 includes clips disposed at the ends thereon adapted to removably secure to the plurality of rings 26. The neck strap 25 is adapted to be placed around a user's neck and capable of supporting the foldable base in a vertical or horizontal orientation thereon. In the illustrated embodiment, the plurality of rings 26 comprise a first pair and second pair of D-rings 26 attached to the upper edge and the lower edge, respectively, of the second panel. The first pair of D-rings 26 are parallel to the second pair of D-rings 26. In the folded position, the D-rings 26 are disposed near the corners of the foldable base. In this way, the ends of the neck strap 25 can be removably attached to the D-rings 26 disposed on the lower end of the second panel, wherein the mobile electronic device holder 11 will be suspended from the user in a vertical orientation. In the alternative, one end of the strap 25 can be removably attached to a D-ring 26 disposed on the lower edge of the second panel and the opposite end of the strap 25 can be removably attached to a D-ring 26 disposed on the upper edge of the second panel, wherein the mobile electronic device holder 11 will be suspended from the user in a horizontal orientation. In some embodiments, the neck strap 25 is adjustable, wherein a buckle or other suitable fastener can be used to adjust the length of the strap 25.

The mobile electronic device holder 11 further comprises one or more loops 23 adapted to hold a stylus 22 therein. In the illustrated embodiment, the loops 23 are attached to the rear surface of the interface of the second and third panel 14. In this way, the loops 23 are attached to the top of the foldable base when the mobile electronic device holder 11 is folded and disposed in a horizontal orientation. The diameter of each loop 23 is similar to the diameter of the stylus 22, allowing the stylus 22 to fit securely therein. In this way, a user can access the stylus 22 for use with a corresponding mobile electronic device that is removably secured to the mobile electronic device holder 11.

The rear surface 62 of first panel 12 includes one or more mounting fasteners 27 disposed thereon adapted to allow the first panel 12 to removably secure to various surfaces, such as a vehicle dashboard holder or the third panel 14. In the illustrated embodiment, the mounting fastener 27 comprises a rectangular shaped magnet disposed on the rear surface 62 of the first panel 12 adapted to receive the closing fastener 24 disposed on the third panel 14. In other embodiments, the mounting fastener 27 can be any suitable shape, such as a circle. The mounting fastener 27 extends to the edge 72 of the first panel 12 so as to allow the third panel 14 to be fastened near the edge 72 thereof in order to fully expose the openings 17. In this way, the camera lens of a mobile electronic device is can be completely exposed without having to remove the mobile electronic device from the foldable base.

In some embodiments, the mobile electronic device holder 11 includes a separate vehicle dashboard holder adapted to be placed on a vehicle dashboard or on the interior of a vehicle window for using as a dashboard camera or navigation system. The vehicle dashboard holder includes a base having a fastener thereon, such as a suction cup, and a platform adapted to receive the first panel 12 therein.

Figure 3A:
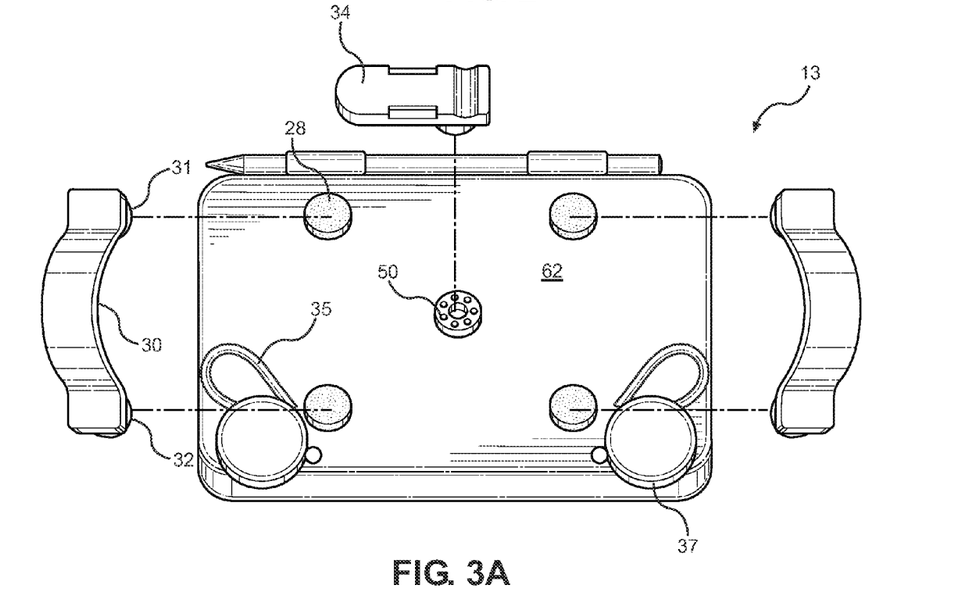
FIG. 3A shows an exploded view of the rear surface of the second panel of the mobile electronic device holder.

Referring now to FIG. 3A, there is shown an exploded view of the rear surface of the second panel of the mobile electronic device holder. The mobile electronic device holder 11 further comprises one or more belt loops 30, wherein the belt loops 30 removably secure to the rear surface 62 of the second panel 13 and are adapted to receive a belt therebetween. In the illustrated embodiment, each belt loop 30 is removably secured to the rear surface 62 by a pair of magnetic fasteners 28. The first end 31 of the belt loop 30 fastens to one magnet 28 and the second end 32 fastens to the other magnet 28. The first pair of magnets 28 are parallel to the second pair of magnets 28, wherein the pair of magnets are equidistance from each other so a belt loop 30 removably secures to one pair of magnets 28 or, in the alternative, the ends 31, 32 of the belt loop 30 attaches to one magnet 28 from each pair. In this way, the mobile electronic device holder 11 can be disposed in a horizontal or vertical orientation on a user's belt. The belt loops 30 are preferably disposed near the sides of the mobile electronic device holder 11 in order to distribute the weight of the holder 11 evenly onto a user's belt. In other embodiments, the belt loops 30 are removably secured by any suitable fastener, such as snaps or clips. Additionally, the mobile electronic device holder 11 is adapted to removably secure to a belt or other garment or accessory by a belt clip 34. The belt clip 34 is removably secured to an adaptor 50 disposed on the center rear surface of the second panel 13. The belt clip 34 and adaptor 50 comprise a ratcheting mechanism so as to allow the mobile electronic device holder 11 to rotate 360 degrees while the belt clip 34 remains stationary and attached to a belt.

The rear surface 62 of the second panel 13 further includes a first and second housing unit 37, wherein the housing units 37 each include one or more visor clips 35 thereon adapted to removably secure the foldable base to a vehicle visor. The visor clips 35 are composed of a flexible material so as to allow the visor clips 35 to bend. In this way, the visor clips 35 are adapted to extend outward from the rear surface 62 of the panel 13 in order to fit over a vehicle visor and can also be disposed into a compacted configuration when the mobile electronic device holder 11 is attached to a belt.

Figures 3B, 4:
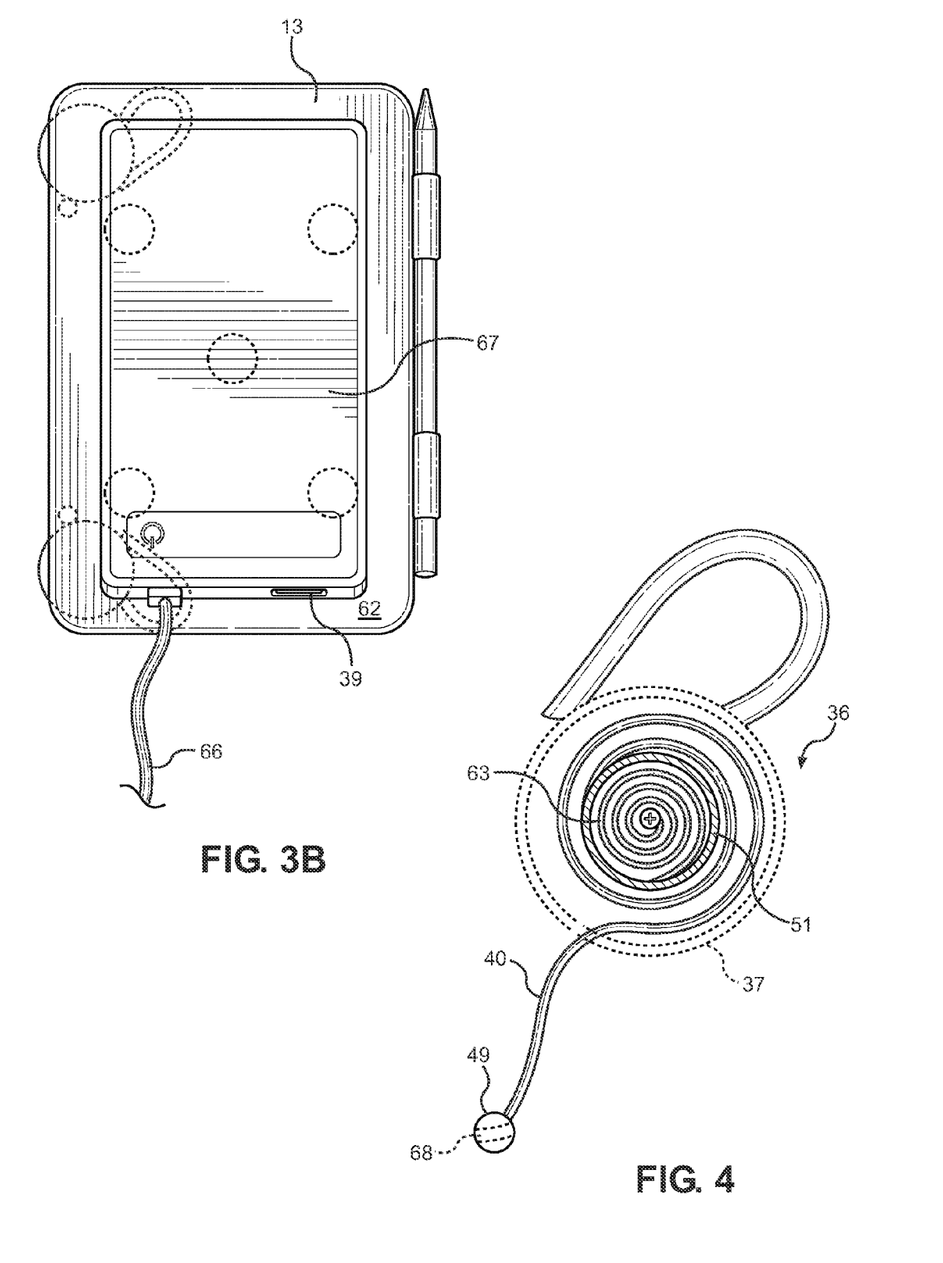
FIG. 3B shows a perspective view of a battery charger of an alternative embodiment of the rear surface of the second panel of the mobile electronic device holder.
FIG. 4 shows a transparent view of the retracting mechanism disposed on the second panel of the mobile electronic device holder.

Now referring to FIG. 3B, there is shown a perspective view of a battery charger of an alternative embodiment of the rear surface of the second panel of the mobile electronic device holder. In an alternative embodiment of the rear surface 62 of the second panel 13, a battery charger 67 is disposed thereon adapted to allow a user to recharge a mobile electronic device when needed. The battery charger 67 is secured to the rear surface 62 by any suitable fastener, such as an adhesive. The battery charger 67 preferably comprises a rectangular shape that corresponds to the shape of the second panel 13. The battery charger 67 further comprises one or more ports 39 adapted to receive a cord 66 therein, wherein the opposing end of the cord 66 is adapted to connect to a mobile electronic device so the mobile electronic device can be charged. The rear surface 62 of the second panel 13 comprises the belt loops, the belt clip, and the first and second housing units with visor clips thereon. The magnets that removably secure the belt loops to the second panel 13 and the adaptor that removably secures the belt clip thereto, are secured to the battery charger 67 by any suitable fastener, such as an adhesive.

Referring now to FIG. 4, there is shown a transparent view of the retracting mechanism disposed on the second panel of the mobile electronic device holder. Each housing unit 37 further comprises a retracting mechanism 36 therein, wherein the retracting mechanism removably secures the second panel to the first panel, such that the first panel is adapted to suspend therefrom (as referenced in FIG. 5). The retracting mechanism 36 comprises several components including a cable 40 adapted to extend therefrom and retract therein. The retracting mechanism 36 further includes a recoil spring 63 adapted to provide force that automatically rewinds the cable 40 within the housing unit 37 and a spool 51 on which the cable 40 is wound. The interior end of the recoil spring 63 is permanently secured to the housing unit 37 and the opposing exterior end of the recoil spring 63 is secured to the inner diameter of the spool 51.

The cable 40 comprises a first end and a second end, wherein the first end is secured to the spool 51 and the second end is removably secured to the first panel by any suitable retracting fastener, such as a clip or hook. The second end of the cable 40 further comprises an adaptor 49 that prevents the cable 40 from fully retracting within the housing unit 37. The adapter 49 comprises a channel 68 therein adapted to receive the retracting fastener therethrough. Referring now to FIG. 5, there is shown a perspective view of an embodiment of the mobile electronic device holder wherein the first panel is suspended from the second panel by the retracting mechanism. The first panel 12 includes a first and a second aperture 42 adapted to receive the corresponding retracting fasteners 41 disposed on the second end of the cable 40 therethrough. A user can attach the visor clips 35 disposed on the second panel 13 to a surface, such as a vehicle visor 38, wherein the first panel 12 is able to suspend therefrom in order to allow a user to watch a movie, or the like, on the mobile electronic device secured to the front surface 61 of the first panel 12.

The first panel 12 and the second panel 13 are removably secured by one or more joining fasteners 64, 65, in addition to the retracting mechanism 36. One or more joining fasteners 64, 65 are disposed along the interface between the edge of the first panel 12 and the second panel 13 that allow the panels to removably and adjustably secure thereto. In the illustrated embodiment, the joining fasteners 64, 65 comprise an elongated magnet 64 disposed along the interface of the first panel 12 and a corresponding elongated magnetic receiving piece 65 disposed along the interface of the second panel 13. The joining fasteners 64, 65 not only allow for the removable attachment of the panels 12, 13, but they adjustably secure the panels 12, 13 wherein the panels 12, 13 are adapted to fold and open while remaining attached. The joining fasteners 64, 65 are disposed beneath a liner, wherein the joining fasteners 64, 65 are protected from damage and wear. In this way, the first panel 12 and second panel 13 can be attached without having the retracting fasteners 41 connected to the second end of the cable 40. The joining fasteners 64, 65 are preferably elongated and rectangular in configuration. In alternate embodiments, any suitable joining fastener can be used to removably and adjustably secure the first panel 12 to the second panel 13, such as hook and loop fastening material.

Figure 6:
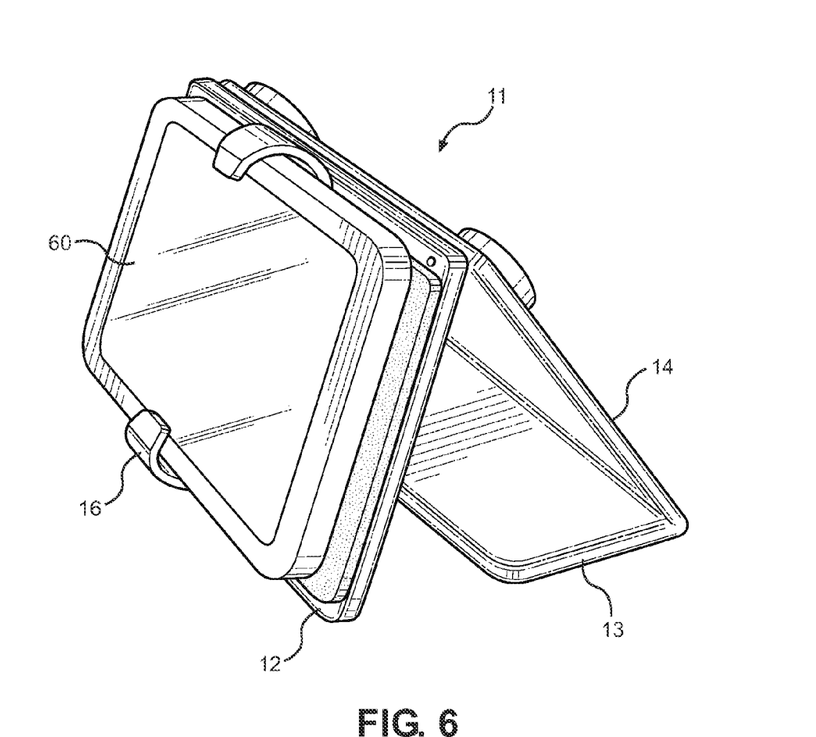
FIG. 6 shows a perspective view of an embodiment of the mobile electronic device holder in an alternate folded configuration.

Referring now to FIG. 6, there is shown a perspective view of an embodiment of the mobile electronic device holder in an alternate folded configuration. In operation, a mobile electronic device 60 is placed on the front surface of the first panel 12. The flexible arms 16 are positioned along the edge of the electronic device in order to secure the device therein. The foldable base can be configured so the device 11 can rest on a horizontal surface. In the alternate folded position, the first panel 12 is vertical, wherein the second panel 13 is connected to the upper end thereof and disposed at a diagonal therefrom. The third panel 14 is folded under the second panel 13, wherein, the front surface of the third panel 14 is flush against the horizontal surface. In this position, the foldable base forms a triangular shape, wherein the rear surface of the foldable base forms the interior of the triangular shape. In this way, a user can watch movies or the like on the mobile electronic device 60 without holding the mobile electronic device holder 11.

Figure 7:
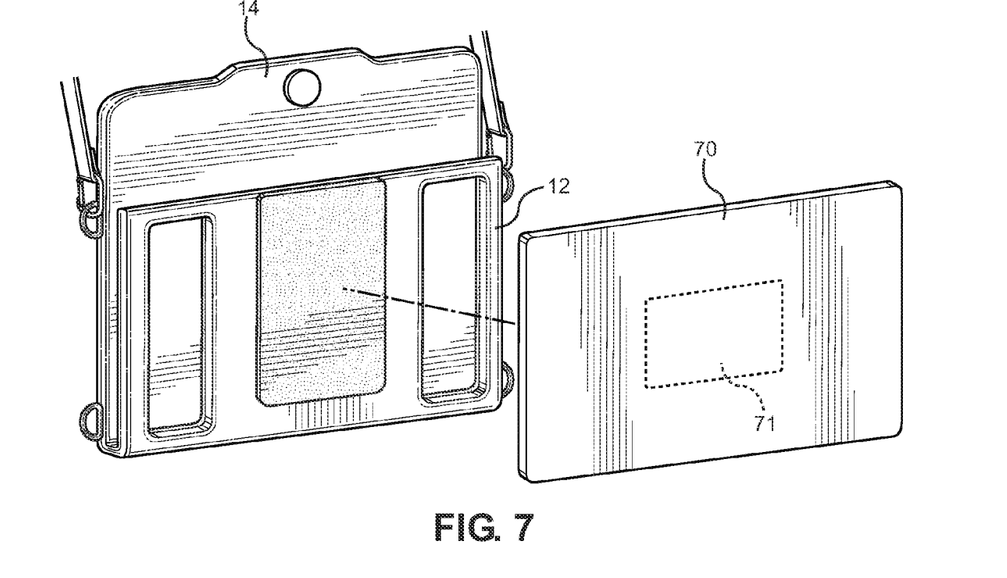
FIG. 7 shows a perspective view of a removable cover of the mobile electronic device holder wherein the cover is positioned over the rear surface of the first panel.

Referring now to FIG. 7, there is shown a perspective view of a removable cover of the mobile electronic device holder wherein the cover is positioned over the rear surface of the first panel. In some embodiments, the mobile electronic device holder comprises a removable cover 70 adapted to conceal the rear surface of the first panel 12. The removable cover 70 is preferably rectangular in shape and corresponds in dimension to the dimension of the first panel 12. The removable cover 70 further comprises a magnetic receiving fastener 71 disposed on the interior thereof and adapted to removably secure to the magnetic mounting fastener 27 disposed on the first panel 12. In this way the openings disposed on the first panel 12 will be covered in order to allow the mobile electronic device holder to have an aesthetically pleasing appearance, as well as protect the camera lens of a mobile electronic device disposed therein.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mobile electronic device holder, comprising:
    a foldable base having a first panel, a second panel, and a third panel, wherein said first panel is removably secured to said second panel and said second panel is secured to said third panel;
    wherein said first panel, said second panel, and said third panel each include a front surface and a rear surface;
    a first housing unit and a second housing unit, wherein said first housing unit and said second housing unit are attached to said second panel, wherein said first housing unit and said second housing unit each include a retracting mechanism therein;
    wherein said retracting mechanism comprises a cable having a first end and a second end, wherein said first end is secured to a housing unit and said second end is removably secured to said first panel, wherein said cable is adapted to retractably connect said second panel to said first panel;
    a pair of arms secured to a first side of said front surface of said first panel and an opposing second side of said front surface of said first panel, wherein said pair of arms is adapted to fit over an edge of a mobile electronic device and removably secure said mobile electronic device there between;
    one or more closing fasteners disposed on said front surface of said third panel and one or more mounting fasteners disposed on said rear surface of said first panel, wherein said closing fastener is adapted to engage and removably secure to said mounting fastener, such that said mobile electronic device is protected in said foldable base in a folded configuration; and
    one or more visor clips secured to each of said first housing unit and said second housing unit, wherein said one or more visor clips are adapted to removably secure said foldable base to a vehicle visor.

2. The mobile electronic device holder of claim 1, wherein second panel comprises a first side opposing a second side, wherein said first panel is removably secured to said first side of said second panel and said third panel is secured to said second side of said second panel, such that said first panel, said second panel, and said third panel are arranged linearly.

3. The mobile electronic device holder of claim 1, wherein said front surface of said first panel includes a pad adapted to removably secure to a rear surface of a mobile electronic device.

4. The mobile electronic device holder of claim 1, wherein said first panel includes one or more openings adapted to allow a camera lens of a mobile electronic device supported by said first panel to be visible therethrough.

5. The mobile electronic device holder of claim 4, further comprising a cover removably secured to said rear surface of said first panel, such that said one or more openings are concealed.

6. The mobile electronic device holder of claim 1, wherein said front surface of said second panel includes one or more pockets adapted to receive items therein.

7. The mobile electronic device holder of claim 1, further comprising one or more key fasteners disposed on said second panel adapted to hold keys thereon.

8. The mobile electronic device holder of claim 1, further comprising one or more belt loops removably attached to said rear surface of said second panel.

9. The mobile electronic device holder of claim 1, further comprising a belt clip removably attached to an adaptor piece that is permanently attached to said rear surface of said second panel.

10. The mobile electronic device holder of claim 9, wherein said belt clip is a ratcheting belt clip.

11. The mobile electronic device holder of claim 1, further comprising said one or more loops attached to an interface of said rear surface of said second panel and said third panel adapted to hold a stylus.

12. The mobile electronic device holder of claim 1, wherein said third panel comprises one or more elongated pockets disposed on said front surface thereof adapted to hold an electronic device cable therein.

13. The mobile electronic device holder of claim 1, further comprising one or more neck straps removably secured to said foldable base adapted to secure around a user's neck.

14. The mobile electronic device holder of claim 13, further comprising a plurality of rings secured to said foldable base adapted to receive a first end of said one or more neck straps and said second end of one or more neck straps, wherein said foldable base can be vertically or horizontally oriented.

15. The mobile electronic device holder of claim 1, further comprising one or more joining fasteners adapted to adjustably and removably secure said first panel to said second panel.

16. The mobile electronic device holder of claim 15, wherein said one or more joining fasteners are magnets disposed along an interfacing edges of said first panel and said second panel.

17. The mobile electronic device holder of claim 1, further comprising a battery charger disposed on said rear surface of said second panel.

18. The mobile electronic device holder of claim 1, wherein said pair of arms are radially extendable.

19. The mobile electronic device holder of claim 1, wherein said one or more closing fasteners are magnetic receiving materials and said one or more mounting fasteners are magnets.

* * * * *